(12) United States Patent
Nishida et al.

(10) Patent No.: US 7,016,561 B2
(45) Date of Patent: Mar. 21, 2006

(54) OPTICAL SWITCH DEVICE HAVING MOVABLE SWITCHING MEMBER

(75) Inventors: Naoki Nishida, Kusatsu (JP); Takuji Hatano, Suita (JP)

(73) Assignee: Minolta Co., Ltd., Osaka (JP)

( * ) Notice: Subject to any disclaimer, the term of this patent is extended or adjusted under 35 U.S.C. 154(b) by 184 days.

(21) Appl. No.: 10/354,347

(22) Filed: Jan. 30, 2003

(65) Prior Publication Data

US 2003/0147582 A1 Aug. 7, 2003

(30) Foreign Application Priority Data

Feb. 7, 2002 (JP) ............................. 2002-030707

(51) Int. Cl.
*G02B 6/35* (2006.01)
(52) U.S. Cl. ..................... 385/16; 385/18; 385/27; 385/40
(58) Field of Classification Search ............ 385/16–23, 385/39, 40
See application file for complete search history.

(56) References Cited

U.S. PATENT DOCUMENTS 5,640,133 A * 6/1997 MacDonald et al. ........ 333/197
5,960,131 A * 9/1999 Fouquet et al. ............... 385/17
6,253,001 B1 * 6/2001 Hoen ........................... 385/17
6,363,183 B1 * 3/2002 Koh ............................. 385/19
6,404,942 B1 * 6/2002 Edwards et al. .............. 385/18
6,463,190 B1 10/2002 Kato et al. .................... 385/16

OTHER PUBLICATIONS

S. Egawa et al., Film Acuators: Planar, Electrostatic Surface-Drive Actuators, Micro Electro Mechanical Systems, 1991, MEMS '91, Proceedings. 'An Investigation of Micro Structures, Sensors, Actuators, Machines, and Robots'. IEEE, pp. 9-14.*

* cited by examiner

*Primary Examiner*—John D. Lee
*Assistant Examiner*—Omar Rojas
(74) *Attorney, Agent, or Firm*—Sidley Austin LLP

(57) ABSTRACT

Disclosed herewith is an optical switch provided on an optical path of an optical waveguide and which switches an advancing direction of a light passed through the optical path. The optical switch includes a movable switching member which switches the advancing direction of the light, and a driving member which electrostatically drives said switching member to move in an arbitrary position so that the light passed through the optical path is guided to different directions.

17 Claims, 19 Drawing Sheets

OPTICAL SWITCH DEVICE HAVING MOVABLE SWITCHING MEMBER

CROSS-REFERENCE TO RELATED APPLICATION

This application is based on Japanese Patent Application No. 2002-30707 filed in Japan on Feb. 7, 2002, the entire content of which is hereby incorporated by reference.

BACKGROUND OF THE INVENTION

1. Field of the Invention

The present invention relates to an optical switch device which is provided on an optical path of an optical waveguide and switches an advancing direction of an incident light to the optical waveguide.

2. Description of the Related Art

In recent years, an optical network is developed for transmitting mass information, and an optical switch as device for dividing a light is used for the optical network. A conventional optical switch switches a light between linear advancing and reflection in such a manner that a micromirror provided on an optical path of a light flux emitted from an optical fiber is supported by a movable plate and the movable plate is moved by applying a voltage so that the micromirror is retracted from the optical path. However, such an optical switch additionally requires a movable plate for moving a micromirror.

In addition, there has been conventionally suggested an optical switch in which a groove section which slantly crosses two crossing optical waveguides is provided, air bubbles are formed in a liquid filling the groove section and the air bubbles are heated by a microheater so as to be moved. According to this optical switch, since a refractive index of the filling liquid and a refractive index of the optical waveguides are set to be approximately equal with each other, when the liquid is provided onto the optical paths of the optical waveguides, a light advances straight, and when air bubbles are provided, a light is reflected so that the advancing direction is switched. However, since such an optical switch carries out heating, it requires a microheater and a heat radiating mechanism.

Besides the above-mentioned optical switches, there is an optical switch which uses a micropump having piezoelectric element or a magnetic force of a magnetic coil in order to drive a mirror or a filter provided on a crossed section of two optical waveguides. However, in a driving mechanism such as a micropump which utilizes a liquid, it is difficult to stop a filter on a predetermined position and its locating mechanism becomes complicated. Moreover, in the case where an electromagnetic force of a coil or the like is used, a driving force generating section including the coil for driving a filter becomes complicated and thus becomes large. Therefore, in those conventional optical switches, there arises a problem that their structure becomes complicated.

Further, in recent years, so-called wavelength multiplex communication is carried out. With this wavelength multiplex communication, different pieces of information are placed on lights (carrier waves) with different wavelengths and a plurality of carrier waves are superposed so that mass information can be transmitted by one optical fiber. However, according to the above-mentioned conventional optical switch, since the lights where wavelengths are multiplexed are reflected or transmitted uniformly, pieces of information placed on the carrier waves cannot be output separately. For this reason, since the pieces of information are branched by an additional branching filter or the like so as to be taken out, there arises a problem that an optical communication system having an optical switch becomes complicated.

SUMMARY OF THE INVENTION

It is a main object of the present invention to provide an optical switch which is capable of separately outputting lights where wavelengths are multiplexed.

It is another object of the present invention to provide an optical switch with a simple structure.

The above objects of the present invention is achieved by providing an optical switch provided on an optical path of an optical waveguide and which switches an advancing direction of a light passed through the optical path of the optical waveguide. The optical switch comprises a movable switching member which switches the advancing direction of the light; and a driving member which electrostatically drives said switching member to move in an arbitrary position so that the light passed through the optical path of the optical waveguide is guided to different directions.

These and other objects, features and advantages of the present invention will become apparent from the following description of the preferred embodiments when the same is read in conjunction with the accompanying drawings.

BRIEF DESCRIPTION OF DRAWINGS

These and other objects, advantages and features of the present invention will become apparent from the following description thereof taken in conjunction with the accompanying drawings in which:

FIG. 16 is a side sectional view showing a structure of a periphery of a groove section in the optical switch 1a;

DESCRIPTION OF THE PREFERRED EMBODIMENTS

There will be explained below an optical switch device according to embodiments of the present invention with reference to the attached drawings.

Firstly, there will be simply explained below a method of manufacturing a waveguide in a main body of an optical switch to be used commonly in the following embodiments. It is noted that FIGS. 1(a) through 1(d) are sectional views of the main body of the optical switch and show the sectionals in a direction which crosses two waveguides provided in the main body.

Figure 1A:
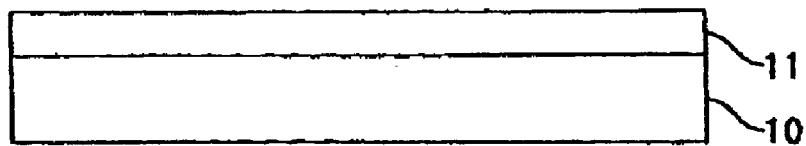
FIGS. 1(a), 1(b), 1(c) and 1(d) are side sectional views respectively showing a method of manufacturing a waveguide in a main body of an optical switch according to the present invention.
Figure 1B:
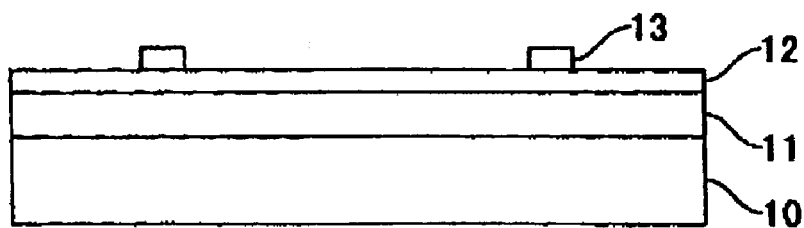

As shown in FIG. 1(a), a lower clad layer 11 made of quartz or the like is deposited on a substrate 10 made of Si or the like by chemical vapor deposition (CVD) or the like. As shown in FIG. 1(b), a core layer 12 made of quartz or the like is deposited on the lower clad layer 11. Refractive index of the lower clad layer 11 is smaller than that of the core layer 12 by doping fluorine. A resist 13 is applied to the core layer 12 by the spin coat process or the like and is exposed or developed so as to be patterned into a predetermined shape.

Figure 1C:
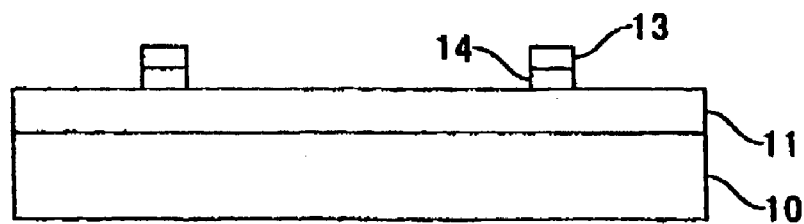
Figure 1D:
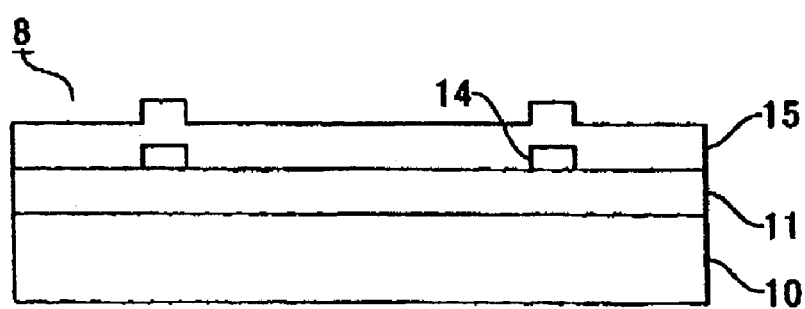

Next, as shown in FIG. 1(c), the core layer 12 is etched by reactive ion etching (RIE) or the like, so that a waveguide 14 with a predetermined shape is formed. In the case where the core layer 12 is made of quartz, CHF3, CF4 or the like is used as a reactive gas of RIE. After the resist 13 is peeled, as shown in FIG. 1(d) an upper clad layer 15 made of the same material as that of the lower clad layer 11 is deposited while fluorine or the like is being doped. As a result, a main body 8, which waveguides an incident light by means of the waveguide 14 sandwiched between the lower clad layer 11 with smaller refractive index and the upper clad layer 15, can be obtained.

There will be explained below respective embodiments of the optical switch composed of the main body 8 having the waveguide 14 manufactured by such a method. In the respective embodiments, the waveguide 14 provided to the main body 8 has the common structure.

<First Embodiment>

Figure 2:
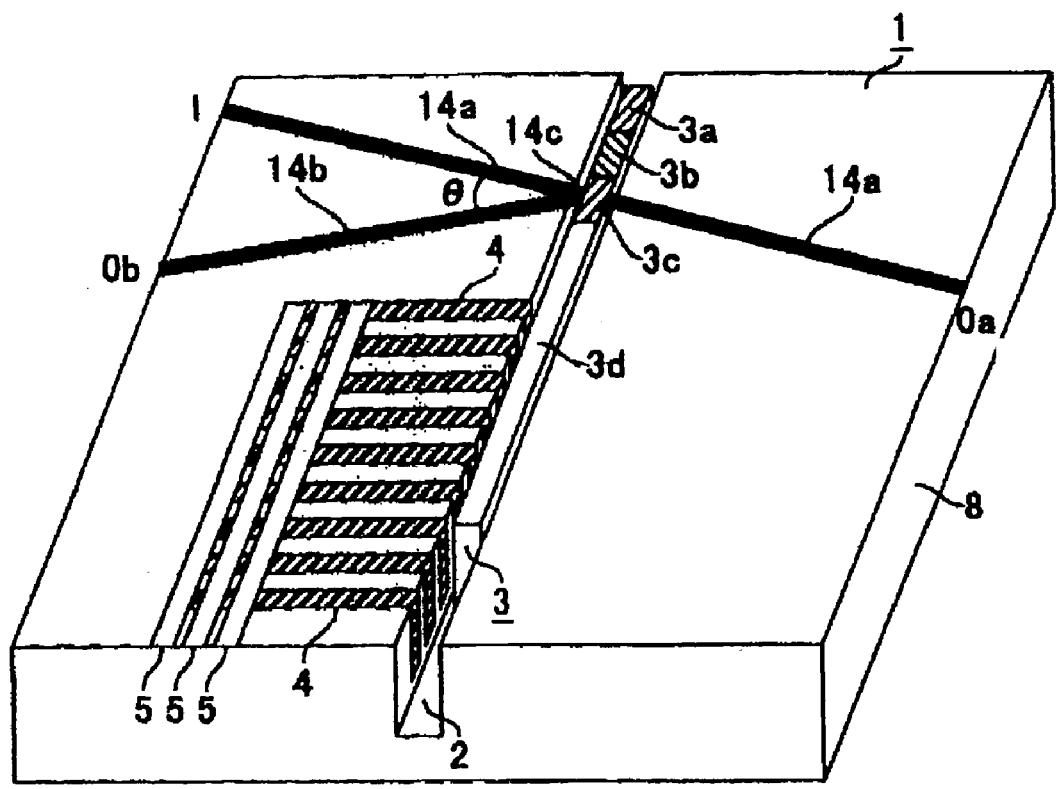
FIG. 2 is an outline perspective view showing a structure of an optical switch 1 according to a first embodiment of the present invention.

FIG. 2 is an outline perspective view showing a structure of an optical switch 1 according to the first embodiment of the present invention. In the optical switch 1, two waveguides 14a and 14b are provided to the main body 8 so as to cross at a predetermined crossing angle θ by the above-mentioned manufacturing method. A groove section 2 is formed so as to cross a crossed section 14c of the waveguides 14a and 14b. A filter 3 is put into the groove section 2. The filter 3 has interference filters 3a through 3c with different optical properties, and a moving element section 3d formed by a resistor material having a predetermined resistance value (for example, $10^{10}$ Ω/□ to $10^{16}$ 106 /□, it is noted that Ω/□ is a unit representing surface resistivity). The groove section 2 is provided with the filter 3. A plurality of electrodes 4 which function as stators with respect to the moving element section 3d are provided to the main body 8 so as to drive the filter 3 along the groove section 2. A three-phase wiring section 5 for applying a three-phase driving voltage is provided to the plural electrodes 4. It is noted that the plural electrodes 4 are covered with an insulating film 7 as mentioned later, but in order to simplify the explanation, it is not shown in FIG. 2.

Figure 3:
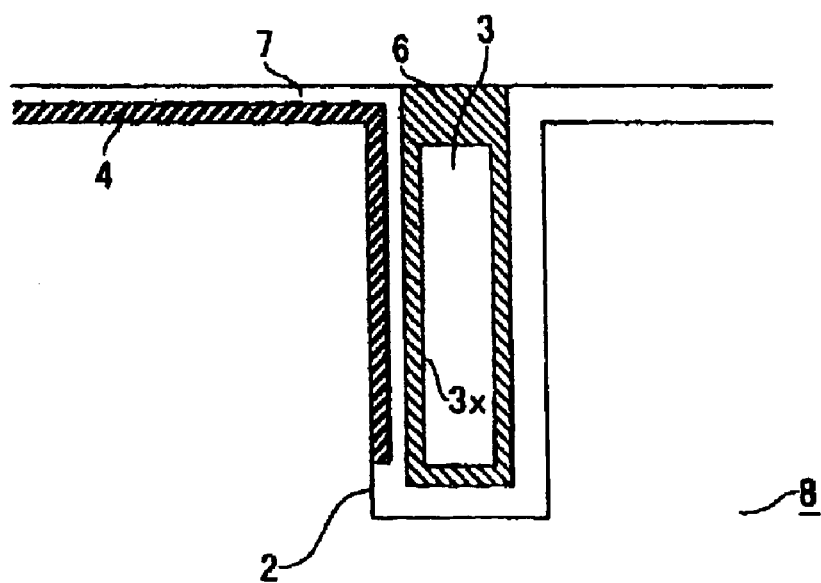
FIG. 3 is a side sectional view showing a structure of a periphery of a groove section in the optical switch 1.

FIG. 3 is a sectional view of the switch 1 of FIG. 2. The electrode 4, which is provided by patterning a metal film such as an aluminum film on a surface of the main body 8, extends to a side surface of the groove section 2. The electrode 4 is provided so as to be opposed to a side surface 3x of the filter 3. In order to insulating the electrode 4 from the filter 3, insulating matching oil 6 such as silicone oil is sealed into the groove section 2. The insulating film 7 is provided onto the surface of the main body 8 so as to cover the electrodes 4.

Since the electrodes 4 are formed by metal, when they are provided so as to be overlapped with the waveguides 14a and 14b, a light is attenuated. Therefore, as shown in FIG. 2, in the main body 8, the electrodes 4 are provided onto portions different from the portion provided with the waveguides 14a and 14b so as to be opposed to the moving element section 3d of the filter 3. The electrodes 4 are metal films with thickness of 1000 Å and width of 5 μm, for example, and gaps between the electrodes are 5 μm.

Figure 4:
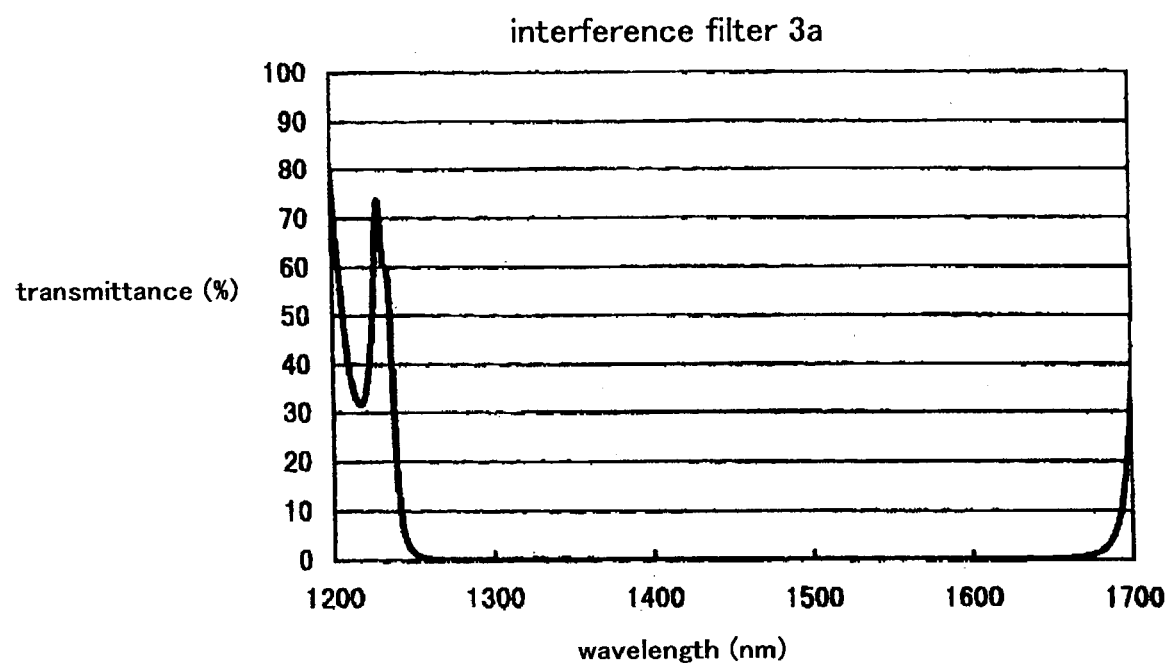
FIG. 4 is a diagram showing transmittance of an interference filter 3a of the optical switch 1.
Figure 5:
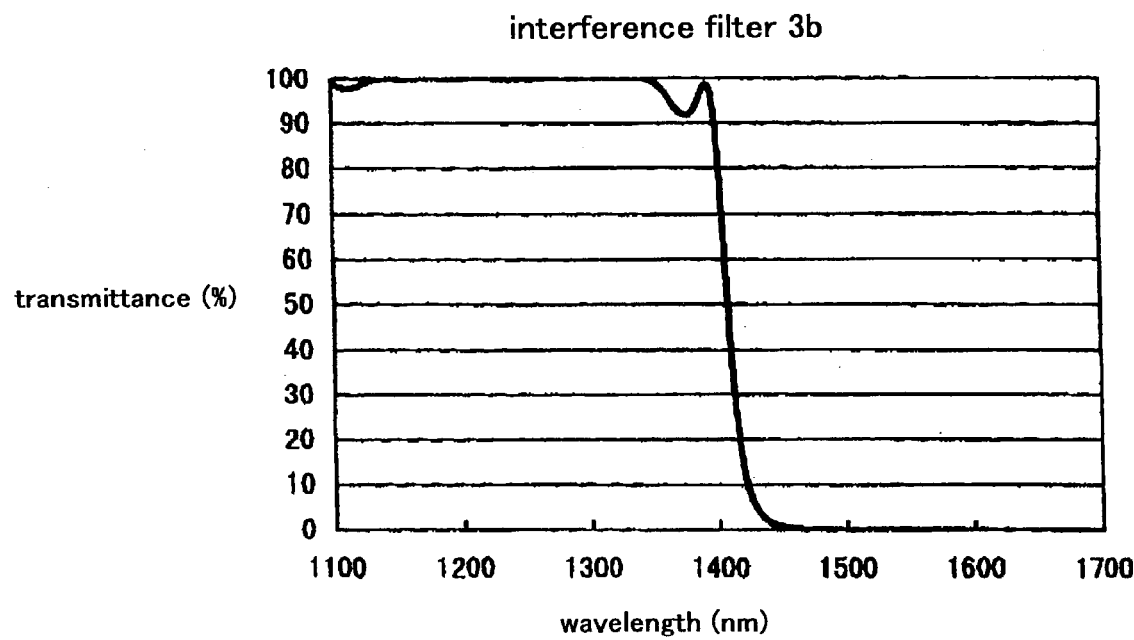
FIG. 5 is a diagram showing transmittance of an interference filter 3b of the optical switch 1.
Figure 6:
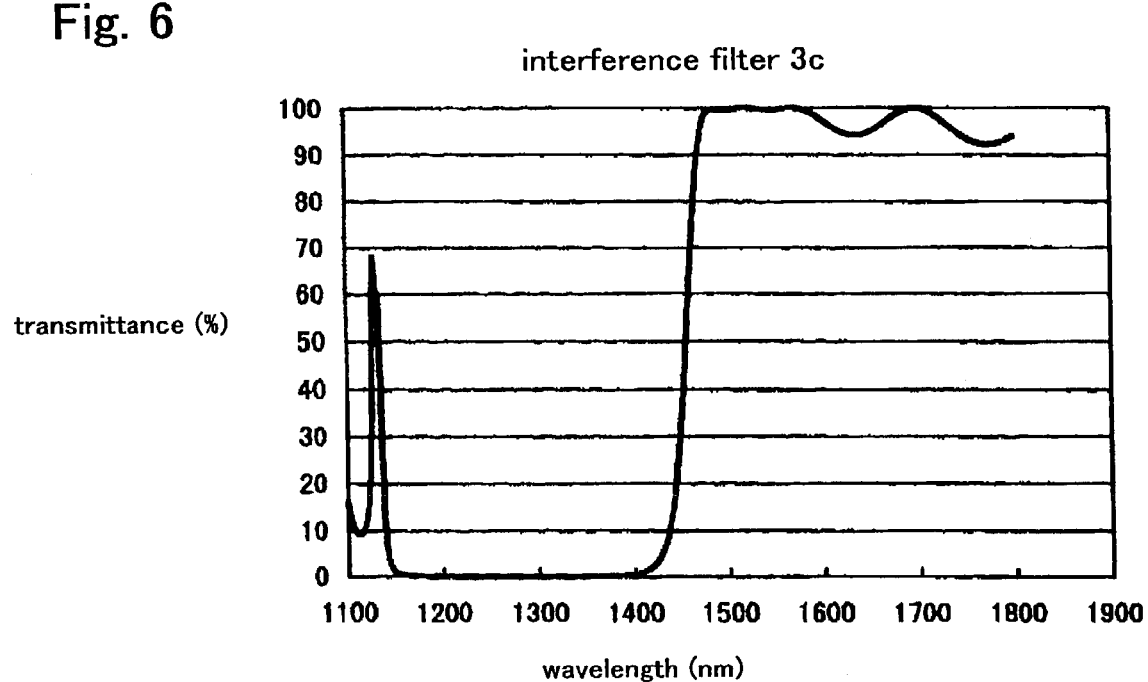
FIG. 6 is a diagram showing transmittance of an interference filter 3c of the optical switch 1.

In the filter 3, the interference filters 3a through 3c have optical properties shown in FIGS. 4 through 6, for example. A light with wavelength λ1 (=1.3 μm=1300 nm) and a light with wavelength λ2 (=1.55 μm=1550 nm) are wavelength-multiplexed into one optical fiber by a fiber coupler, and a light flux which enters the optical switch 1 enters from an input port I (see FIG. 2).

Figure 7:
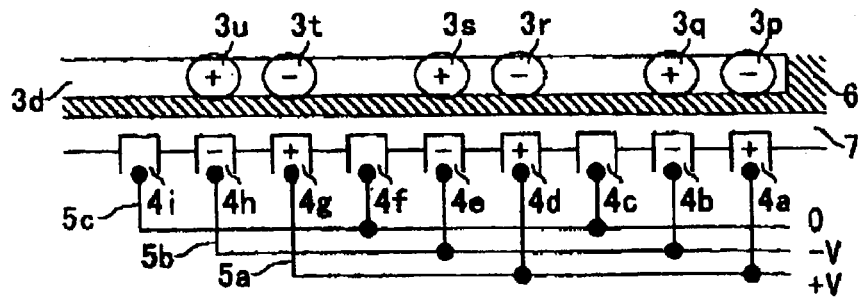
FIGS. 7(a), 7(b), 7(c) and 7(d) are respectively diagrams showing a relationship between a moving element section and electrodes of each filter when each filter moves.
Figure 7:
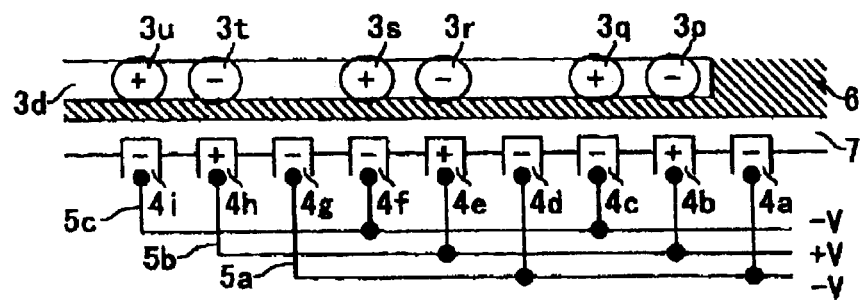
Figure 7:
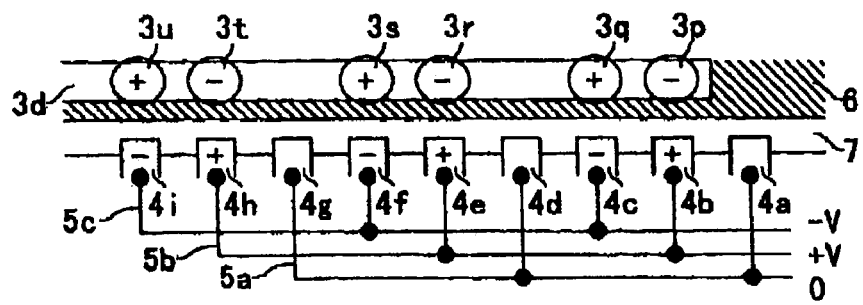
Figure 7:
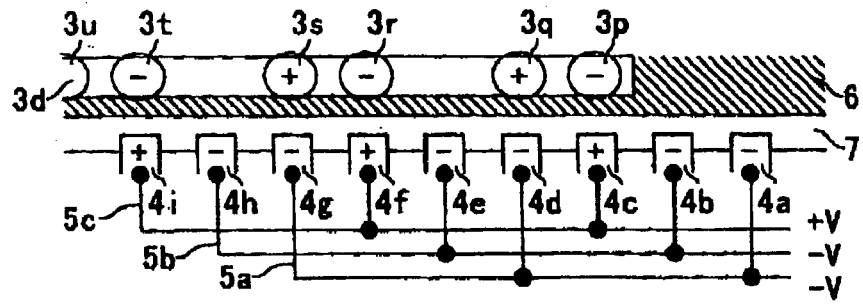
Figure 8:
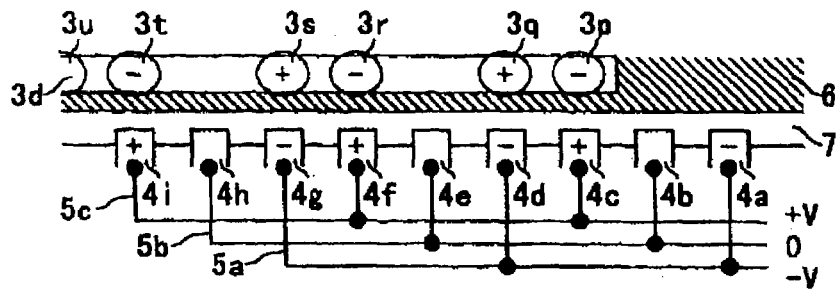
FIGS. 8(a), 8(b), 8(c) and 8(d) are diagrams respectively showing a relationship between the moving element section and the electrodes of each filter when each filter moves.
Figure 8:
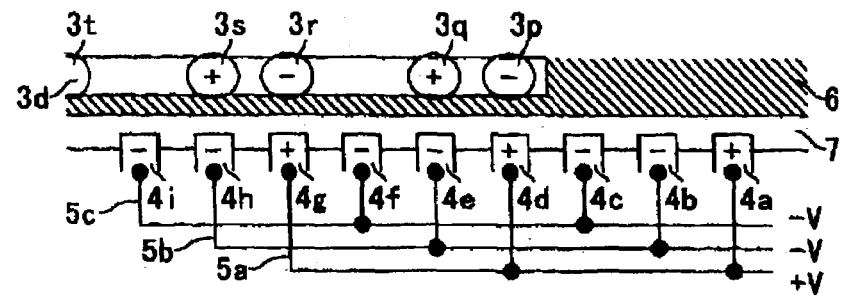
Figure 8:
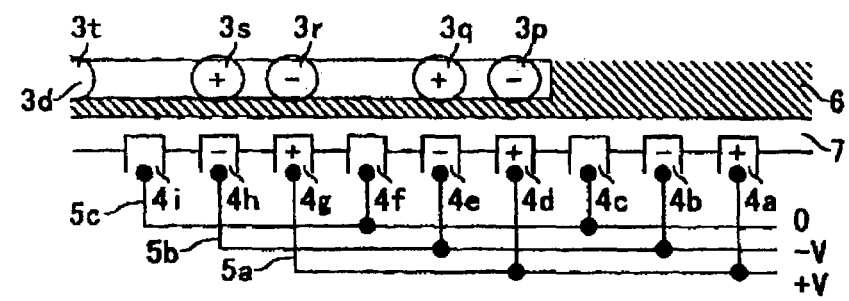
Figure 8:
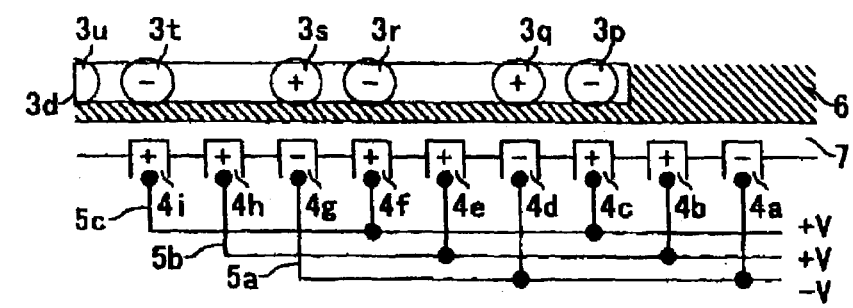
Figure 9:
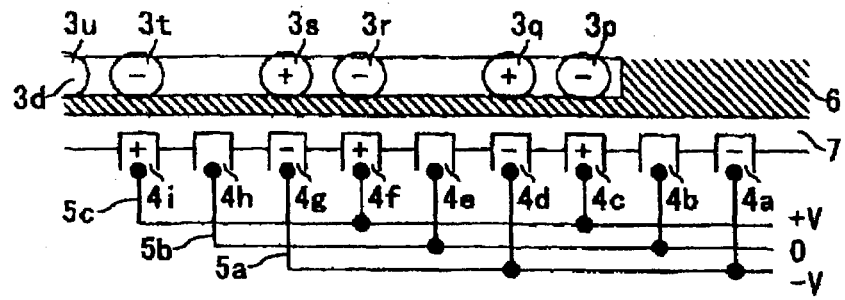
FIGS. 9(a), 9(b), 9(c) and 9(d) are diagrams respectively showing a relationship between the moving element section and the electrodes of each filter when each filter moves.
Figure 9:
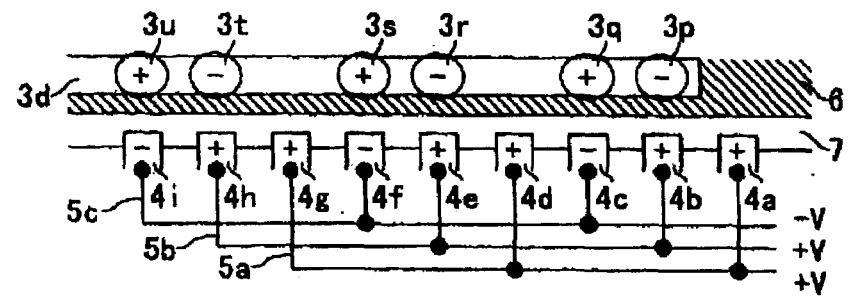
Figure 9:
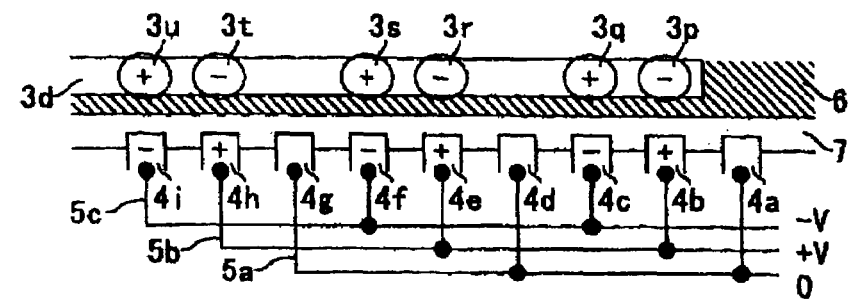
Figure 9:
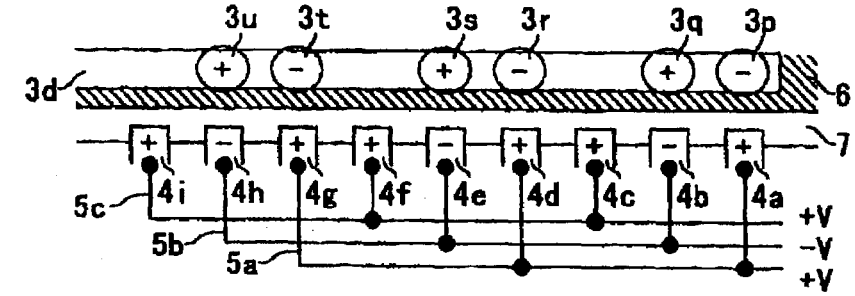
Figure 10:
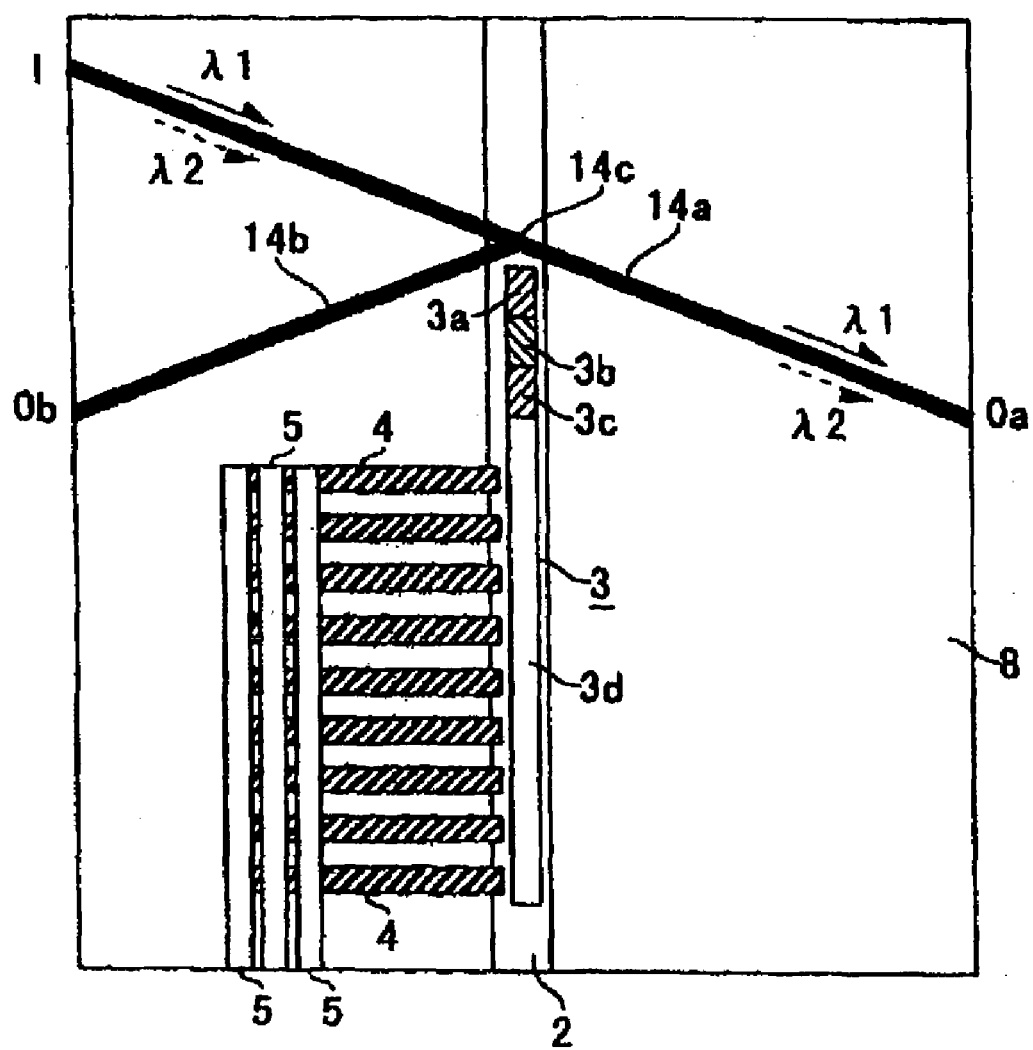
FIG. 10 is a plan view showing a state of the optical switch 1 in an initial state (total transmitting mode)

Next, there will be explained below a driving method of the filter 3 when the electrodes 4 are provided in the above manner with reference to FIGS. 7 through 13. It is noted that as for the electrodes 4, as shown in FIGS. 7 through 9, the electrodes 4a through 4i are provided, the electrodes 4a, 4d and 4g are connected with a wiring 5a of the three-phase wiring section 5, the electrodes 4b, 4e and 4h are connected with a wiring 5b, and the electrodes 4c, 4f and 4i are connected with a wiring 5c. When the optical switch 1 is in an initial state (total transmitting mode), as shown in FIG. 10, all the interference filters 3a through 3c of the filter 3 are retracted from the crossed section 14c of the waveguides 14a and 14b. The widths between the electrodes 4 and the widths of the interference filters 3a through 3c are equal. It is noted that in order to simplify the explanation, the matching oil 6 and the insulating film 7 are not shown in FIGS. 10 through 13.

In the initial state shown in FIG. 10, the lights with wavelengths λ1 and λ2 which enter from the input port 1 directly advance in the waveguide 14a and are output from a first output port Oa. At this time, as shown in FIG. 7(a), a positive voltage +V is applied to the wiring 5a, a negative voltage −V is applied to the wiring 5b and a ground voltage is applied to the wiring 5c. As a result, the electrodes 4a, 4d and 4g are charged with positive polarity, and the electrodes 4b, 4e and 4h are charged with negative polarity. At this time, in the moving element section 3d of the filter 3 opposed to the electrodes 4a through 4i, portions 3p, 3r and 3t opposed to the electrodes 4a, 4d and 4g are charged with negative polarity, and portions 3q, 3s and 3u opposed to the electrodes 4b, 4e and 4h are charged with positive polarity.

Figure 11:
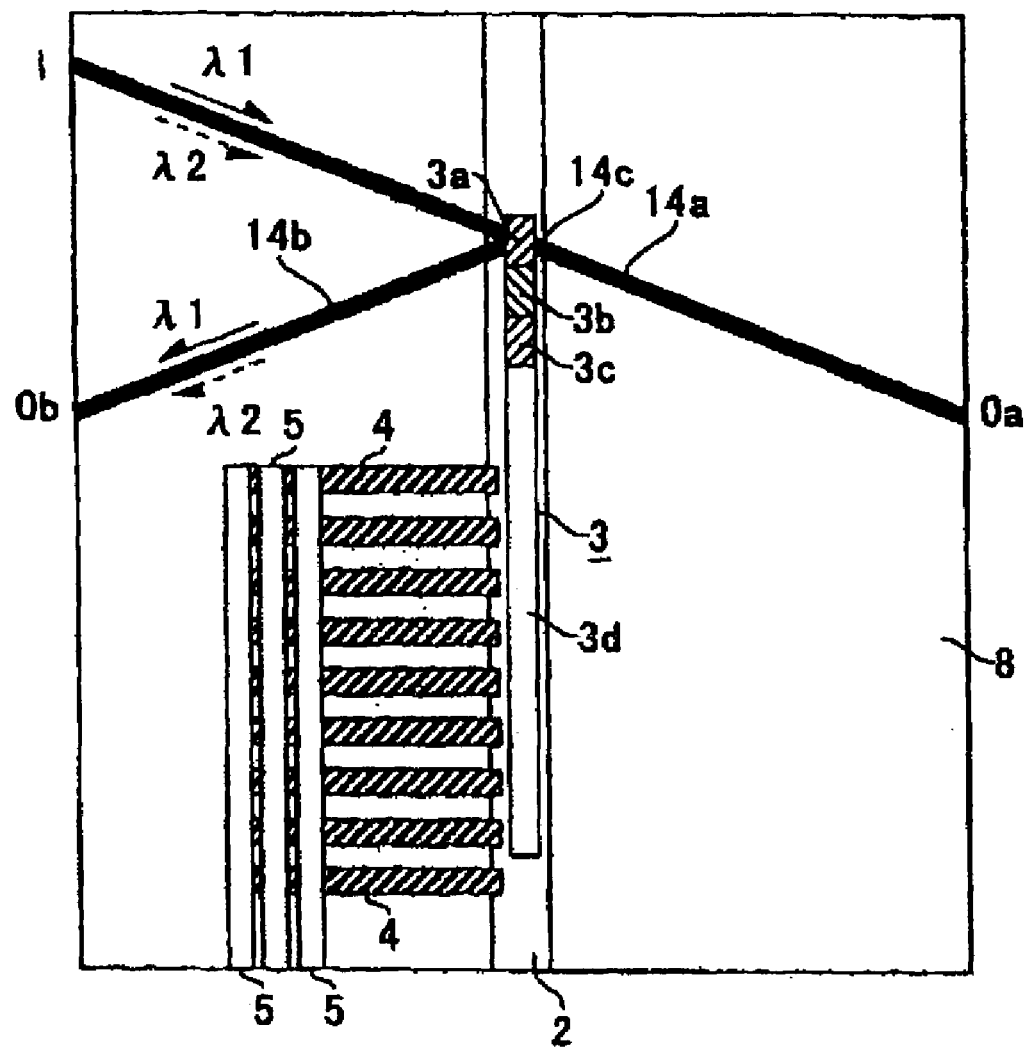
FIG. 11 is a plan view showing a state of the optical switch 1 in a total reflection mode.

When the filter 3 is moved from the initial state in FIG. 10 and the interference filter 3a of the filter 3 is arranged on the crossed section 14c of the waveguides 14a and 14b (total reflection mode) as shown in FIG. 11, a voltage to be applied to the three-phase wiring section 5 is switched so that a negative voltage −V is applied to the wirings 5a and 5c and a positive voltage +V is applied to the wiring 5b as shown in FIG. 7(b). At this time, the moving of electric charges accumulated on the portions 3p through 3u is disturbed by high resistance so as to be stopped in the moving element section 3d of the filter 3.

At this time, a repulsive force acts upon the portions 3p, 3r and 3t due to the electrodes 4a, 4c, 4d, 4f and 4g charged with negative polarity, and simultaneously an attracting force acts thereon due to the electrodes 4b, 4e and 4h charged with positive polarity. Similarly, a repulsive force acts upon the portions 3q, 3s and 3u due to the electrodes 4b, 4e and 4h charged with positive polarity, and simultaneously an attracting force acts thereon due to the electrodes 4c, 4f and 4i charged with negative polarity. As a result, a repulsive force acts upon the filter 3 to a vertical direction of FIG. 7, and a driving force is generated to the left side, so that the filter 3 moves by one width of the electrodes 4. As a result, the portions 3p, 3r and 3t are opposed to the electrodes 4b, 4e, and 4h charged with positive polarity, and the portions 3q, 3s and 3u are opposed to the electrodes 4c, 4f and 4i charged with negative polarity.

A ground voltage is applied to the wiring 5a, a positive voltage +V is applied to the wiring 5b and a negative voltage −V is applied to the wiring 5c as shown in FIG. 7(c), and the position of the filter 3 is fixed so that the interference filter 3a of the filter 3 is arranged on the crossed section 14c of the waveguides 14a and 14b as shown in FIG. 11. The transmittance of the interference filter 3a is approximately 0% at the wavelengths λ1 and λ2 (see FIG. 4). Therefore, the lights with wavelengths λ1 and λ2 which have entered from the input port I are reflected by the interference filter 3a of the filter 3 so as to advance in the waveguide 14b and output from a second output port Ob.

Figure 12:
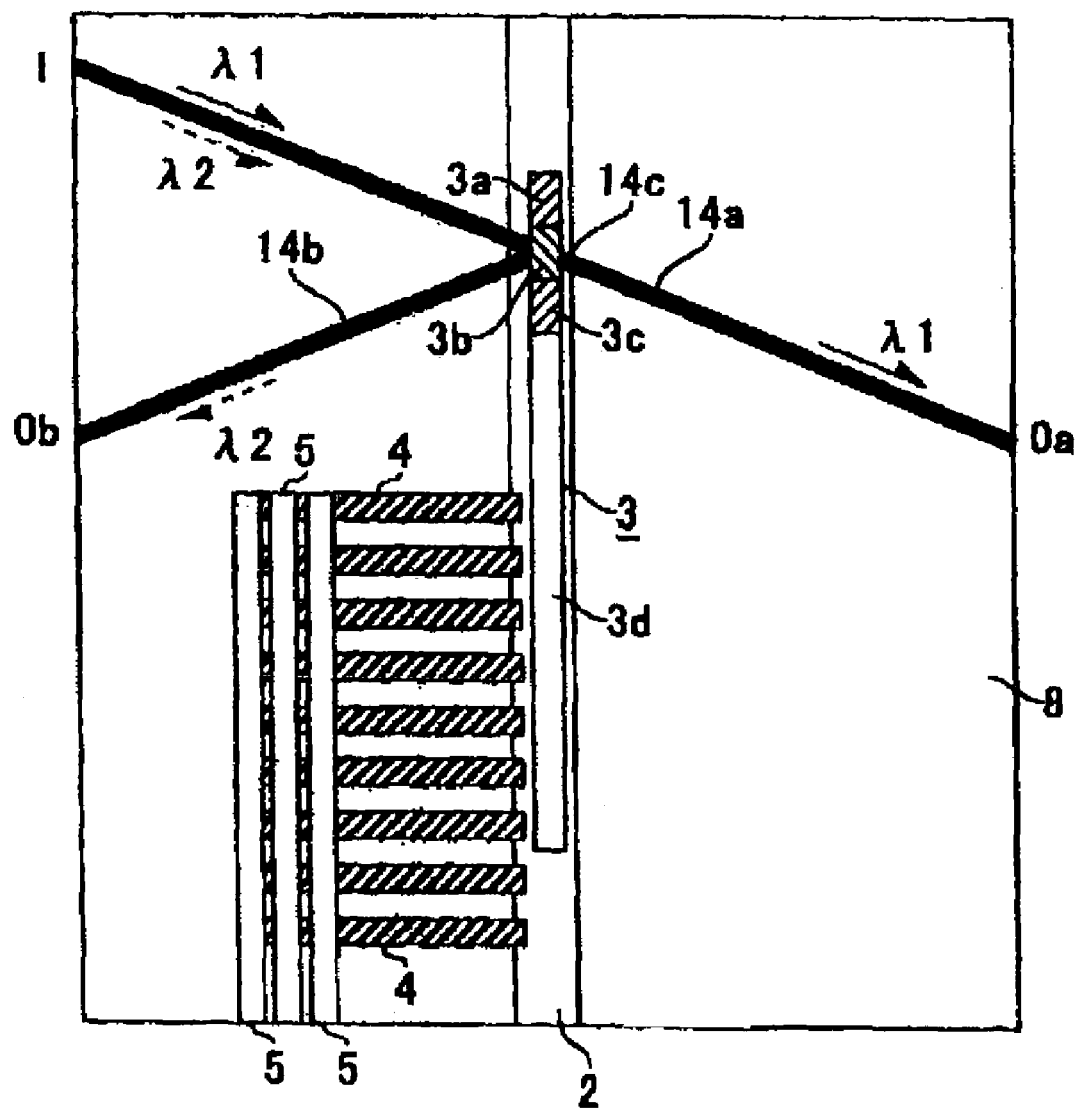
FIG. 12 is a plan view showing a state that the optical switch 1 allows a wavelength λ1 to transmit.

In the case where the interference filter 3b of the filter 3 is arranged on the crossed section 14c of the waveguides 14a and 14b as shown in FIG. 12 from the state in FIG. 11, a voltage to be applied to the three-phase wiring section 5 is switched so that a negative voltage −V is applied to the wirings 5a and 5b and a positive voltage +V is applied to the wiring 5c as shown in FIG. 7(d). At this time, similarly to the time when the position of the interference filter 3 is changed from the state in FIG. 10 into the state in FIG. 11, a repulsive force acts upon the filter 3 to the vertical direction of FIG. 7 and a driving force is generated to the left side. As a result, the filter 3 moves by one width of the electrodes 4, and the portions 3p, 3r and 3t are opposed to the electrodes 4c, 4f and 4i charged with positive polarity and the portions 3q and 3s are opposed to the electrodes 4d and 4g charged with negative polarity in the moving element section 3d.

A negative voltage −V is applied to the wiring 5a, a ground voltage is applied to the wiring 5b and a positive voltage +V is applied to the wiring 5c as shown in FIG. 8(a), and the position of the filter 3 is fixed so that the interference filter 3b of the filter 3 is arranged on the crossed section 14c of the waveguides 14a and 14b. At this time, the transmittance of the interference filter 3b is approximately 100% at the wavelength λ1, and the transmittance is approximately 0% at the wavelength λ2 (see FIG. 5). For this reason, the light with wavelength λ1 which has entered from the input port I transmits through the filter 3 so as to linearly advance in the waveguide 14a and output from the first output port Oa. Moreover, the light with wavelength λ2 is reflected by the interference filter 3b of the filter 3 so as to linearly advance in the waveguide 14b and output from the second output port Ob.

Figure 13:
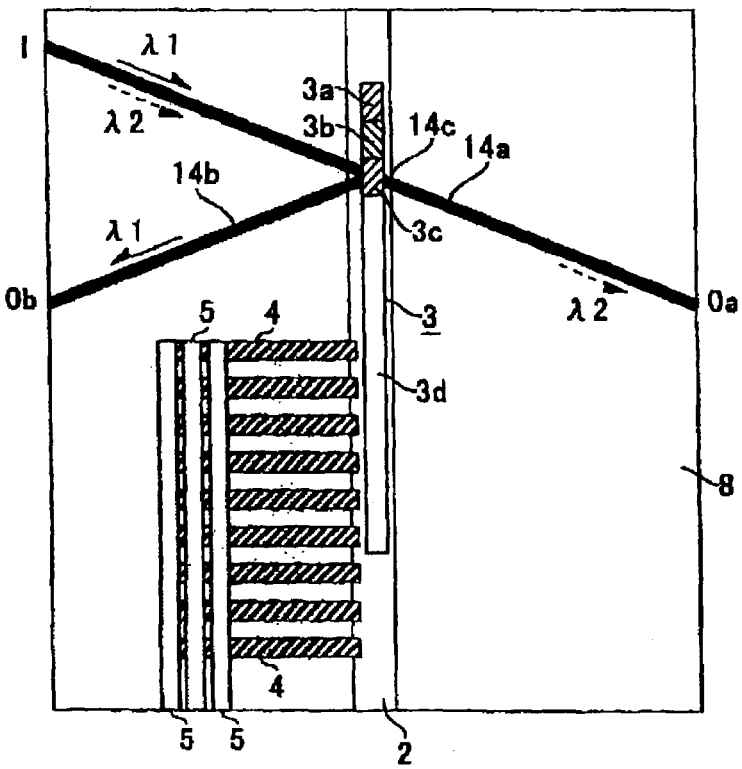
FIG. 13 is a plan view showing a state that the optical switch 1 allows a wavelength λ2 to transmit.

Further, when the interference filter 3c of the filter 3 is arranged on the crossed section 14c of the waveguides 14a and 14b as shown in FIG. 13 from the state in FIG. 12, a voltage to be applied to the three-phase wiring section 5 is switched so that a positive voltage +V is applied to the wiring 5a and a negative voltage −V is applied to the wirings 5b and 5c as shown in FIG. 8(b). As a result, the filter 3 moves by one width of the electrodes 4, and the portions 3p and 3r are opposed to the electrodes 4d and 4g charged with positive polarity, and the portions 3q and 3s are opposed to the electrodes 4e and 4h charged with negative polarity.

A positive voltage +V is applied to the wiring 5a, a negative voltage −V is applied to the wiring 5b and a ground voltage is applied to the wiring 5c as shown in FIG. 8(c), and the position of the filter 3 is fixed so that the interference filter 3c of the filter 3 is arranged on the crossed section 14c of the waveguides 14a and 14b as shown in FIG. 13. The transmittance of the interference filter 3c is approximately 0% at wavelength λ1, and the transmittance is approximately 100% at wavelength λ2 (see FIG. 6). For this reason, the light with wavelength λ1 which has entered from the input port I is reflected by the interference filter 3c of the filter 3 so as to linearly advance in the waveguide 14b and output from the second output port Ob. Meanwhile, the light with wavelength λ2 transmits through the interference filter 3c of the filter 3 so as to linearly advance in the waveguide 14a and output from the first output port Oa.

On the contrary, when the state is changed from the state in FIG. 13 into the state in FIG. 12, a voltage to be applied to the three-phase wiring section 5 is switched so that a negative voltage −V is applied to the wiring 5a and a positive voltage +V is applied to the wirings 5b and 5c as shown in FIG. 8(d). At this time, a repulsive force acts upon the portions 3p, 3r and 3t due to the electrodes 4d and 4g charged with negative polarity, and an attracting force acts thereon due to the electrodes 4c, 4f and 4i charged with positive polarity. Similarly, a repulsive force acts upon the portions 3q and 3s due to the electrodes 4e, 4f, 4h and 4i charged with positive polarity, and simultaneously an attracting force acts thereon due to the electrodes 4d and 4g charged with negative polarity.

As a result, a repulsive force acts upon the filter 3 to the vertical direction in FIG. 8, and a driving force is generated to the right side, so that the filter 3 moves by one width of the electrodes 4. As a result, the portions 3p, 3r and 3t are opposed to the electrodes 4c, 4f and 4i charged with positive polarity, and the portions 3q and 3s are opposed to the electrodes 4d and 4g charged with negative polarity. A negative voltage −V is applied to the wiring 5a, a ground voltage is applied to the wiring 5*b* and a positive voltage +v is applied to the wiring 5*c* as shown in FIG. 9(*a*), and the position of the filter 3 is fixed so that and the interference filter 3*b* of the filter 3 is arranged on the crossed section 14*c* of the waveguides 14*a* and 14*b* as shown in FIG. 12.

When the state is switched from the state in FIG. 12 into the state in FIG. 11, a voltage to be applied to the three-phase wiring section 5 is switched so that a positive voltage +V is applied to the wirings 5*a* and 5*b* and a negative voltage −V is applied to the wiring 5*c* as shown in FIG. 9(*b*). As a result, a repulsive force acts upon the filter 3 to the vertical direction in FIG. 9 and a driving force is generated to the right side, so that the filter 3 moves by one width of the electrodes 4. A ground voltage is applied to the wiring 5*a*, a positive voltage +V is applied to the wiring 5*b* and a negative voltage −V is applied to the wiring 5*c* as shown in FIG. 9(*c*), and the position of the filter 3 is fixed so that the interference filter 3*a* of the filter 3 is arranged on the crossed section 14*c* of the guide waves 14*a* and 14*b* as shown in FIG. 11.

When the state is changed from the state in FIG. 11 into the state in FIG. 10, a voltage to be applied to the three-phase wiring section 5 is switched so that a positive voltage +V is applied to the wirings 5*a* and 5*c* and a negative voltage −V is applied to the wiring 5*b* as shown in FIG. 9(*d*). As a result, a repulsive force acts upon the filter 3 to the vertical direction in FIG. 9 and a driving force is generated to the right side, so that the filter 3 moves by one width of the electrodes 4. Again a positive voltage +V is applied to the wiring 5*a*, a negative voltage −V is applied to the wiring 5*b* and a ground voltage is applied to the wiring 5*c* as shown in FIG. 7(*a*), and the filter 3 is arranged in a position where all the interference filters 3*a* through 3*c* are retracted from the crossed section 14*c* of the waveguides 14*a* and 14*b* as shown in FIG. 10.

When the interference filters 3*a* through 3*c* of the filter 3 are moved one by one by performing the above operations, a voltage to be applied to the three-phase wiring section 5 is switched in the order of FIG. 7(*b*), FIG. 7(*d*) and FIG. 8(*a*), so that the state can be changed from the state in FIG. 10 into the state in FIG. 12. Moreover, a voltage to be applied to the three-phase wiring section 5 is switched in the order of FIG. 7(*b*), FIG. 7(*d*), FIG. 8(*b*) and FIG. 8(*c*), so that the state can be changed from the state in FIG. 10 into the state in FIG. 13. Further, a voltage to be applied to the three-phase wiring section 5 is switched in the order of FIG. 7(*d*), FIG. 8(*b*) and FIG. 8(*c*), so that the state can be changed from the state in FIG. 11 into the state in FIG. 13.

On the contrary, a voltage to be applied to the three-phase wiring section 5 is switched in the order of FIG. 8(*d*), FIG. 9(*b*) and FIG. 9(*c*), so that the state can be changed from the state in FIG. 13 into the state in FIG. 11. Moreover, a voltage to be applied to the three-phase wiring section 5 is switched in the order of FIG. 8(*d*), FIG. 9(*b*), 9(*d*) and FIG. 7(*a*), so that the state can be changed from the state in FIG. 13 into the state in FIG. 10. Further, a voltage to be applied to the three-phase wiring section 5 is switched in the order of FIG. 9(*b*), FIG. 9(*d*) and FIG. 7(*a*), so that the state can be changed from the state in FIG. 12 into the state in FIG. 10.

Figure 14:
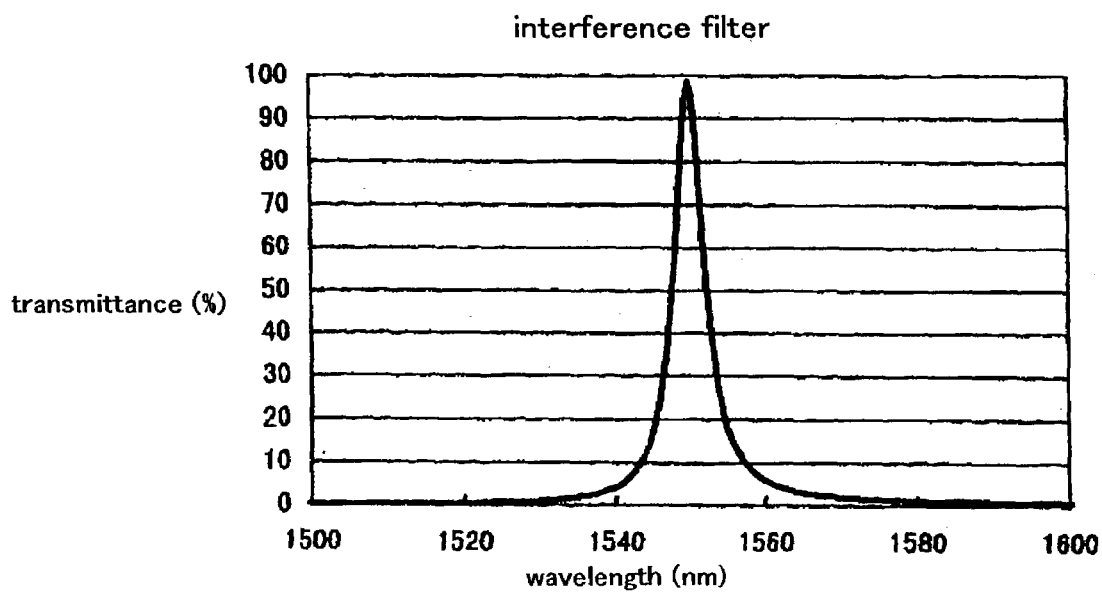
FIG. 14 is a diagram showing transmittance of another interference filter provided to the optical switch 1 according to the first embodiment of the present invention.

Therefore, an inductive charge type electrostatic system by means of the electrodes 4 and the moving element section 3*d* of the filter 3 is utilized so as to move the filter 3, so that a wavelength multiplexed light flux where carrier waves with plural wavelengths are superposed can be switched among total reflection, total transmission, partial transmission and partial reflection. Moreover, as shown in FIG. 14, the interference filter can be set as a narrow band which allows only a light with wavelength of 1.55 μm (1550 nm) to transmit through, for example.

According to the present embodiment, since wavelength multiplexed incident lights can be output separately by switching per wavelength, an additional branching filter or the like is not required thereby simplifying an optical communication system.

<Second Embodiment>

Figure 15:
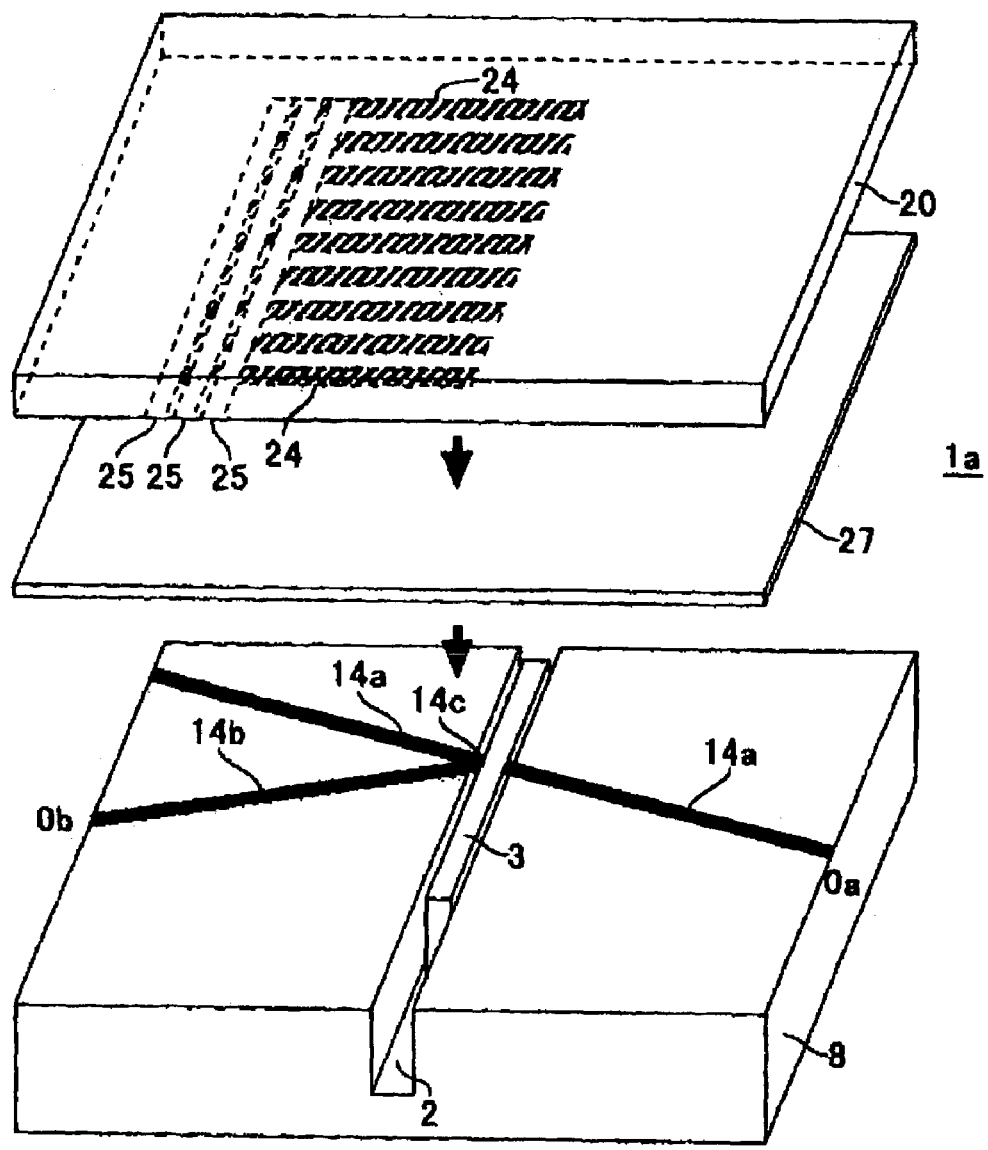
FIG. 15 is an exploded sectional view showing a structure of a periphery of a groove section in an optical switch 1a according to a second embodiment of the present invention.

FIG. 15 is an exploded perspective view showing a structure of an optical switch 1*a* according to a second embodiment of the present invention. Similarly to the first embodiment, in the optical switch 1*a*, a main body 8 is formed with two waveguides 14*a* and 14*b*, and a groove section 2 which crosses a crossed section 14*c* of the waveguides 14*a* and 14*b*. A filter 3 is put into the groove section 2 into which matching oil 6 such as silicone oil has been sealed.

Further, a rear surface of a cover section 20 covering an upper surface of the main body 8 via an insulating film 27 is provided with a plurality of electrodes 24 which function as stators for a moving element section 3*d*, and a three-phase wiring section 25 which applies a three-phase driving voltage to the plural electrodes 24. It is noted that the cover section 20 is shown in a transmitted form in order to show a relationship between the electrodes 24 and the three-phase wiring section 25. The electrodes 24 are provided on positions which cross the moving element section 3*d* of the filter 3. The electrodes 24 are made of metal films with thickness of 1000 Å and width of 5 μm, for example, similarly to the first embodiment, and gaps between the electrodes are 5 μm.

Figure 16:
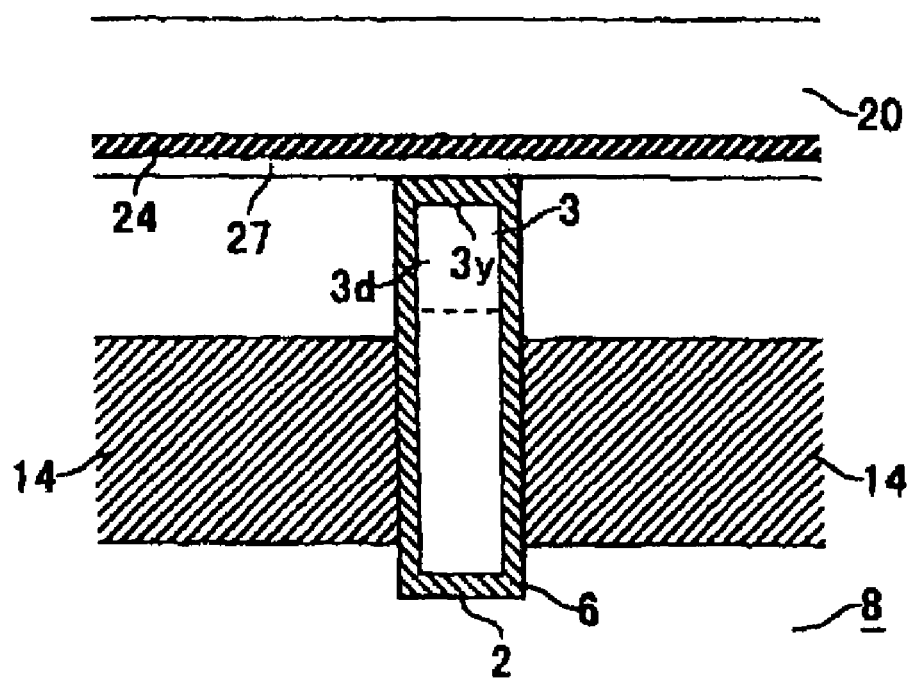

FIG. 16 is a sectional view of the optical switch 1*a*. The electrodes 24 are opposed to an upper surface 3*y* of the filter 3 put into the groove section 2 via the matching oil 6 and the insulating film 27. Since the operation of the optical switch 1*a* having such a structure is similar to that of the first embodiment, the explanation thereof is omitted.

<Third Embodiment>

Figure 17:
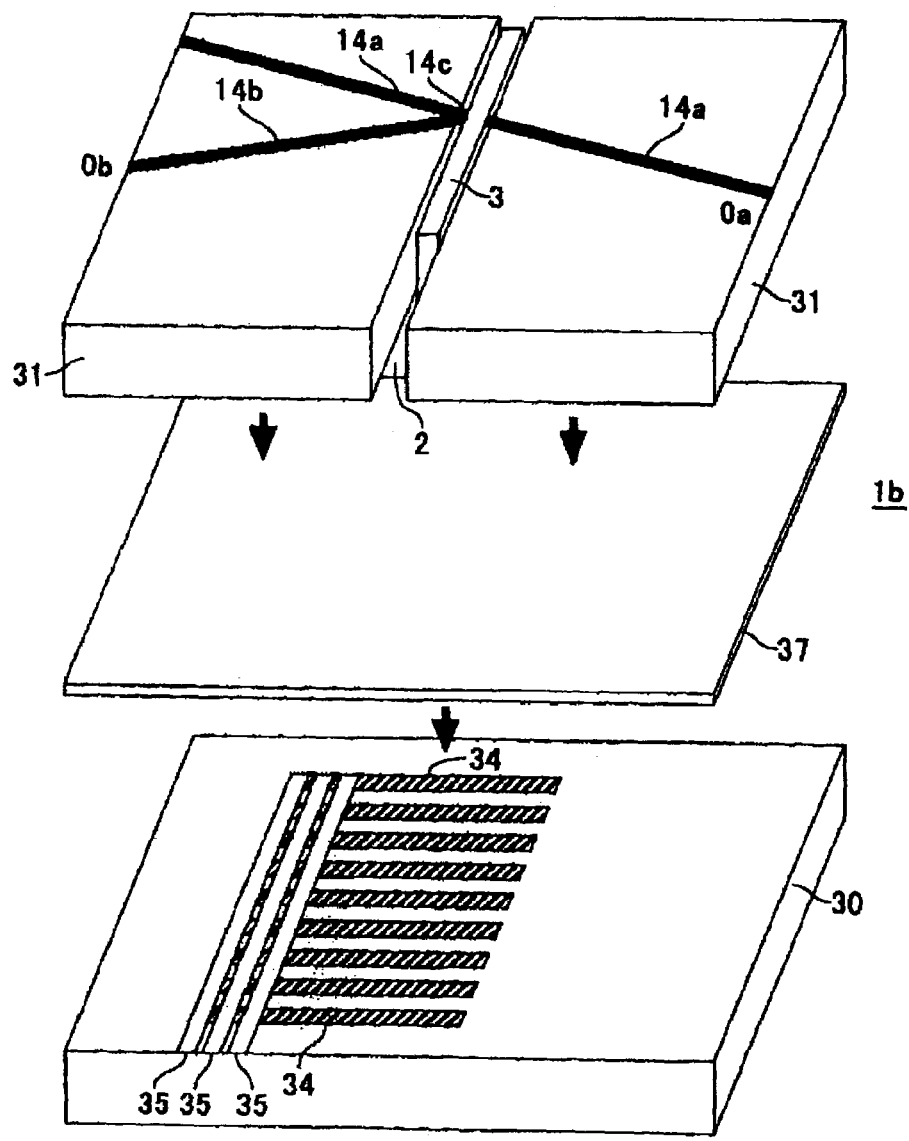
FIG. 17 is an exploded sectional view showing a structure of a periphery of a groove section in an optical switch 1b according to a third embodiment of the present invention.

FIG. 17 is an exploded perspective view showing a structure of an optical switch 1*b* according to a third embodiment of the present invention. In the optical switch 1*b* of the present embodiment, after a surface of a substrate 30 is provided with a plurality of electrodes 34 which function as stators and a three-phase wiring section 35 which applies a three-phase driving voltage to the plural electrodes 34, an insulating film 37 is provided thereon so as to cover the upper surface. A clad layer 31 having waveguides 14*a* and 14*b* are provided on the upper surface of the insulating film 37 so that a groove section 2 which crosses a crossed section 14*c* of the two waveguides 14*a* and 14*b* is formed. A filter 3 is put into the groove section 2 into which matching oil 6 such as silicone oil has been sealed. The electrodes 34 are provided on positions which cross a moving element section 3*d* of the filter 3. Moreover, the electrodes 34 are made of metal films with thickness of 1000 Å and width of 5 μm, for example, similarly to the first embodiment, and gaps between the electrodes are 5 μm.

Figure 18:
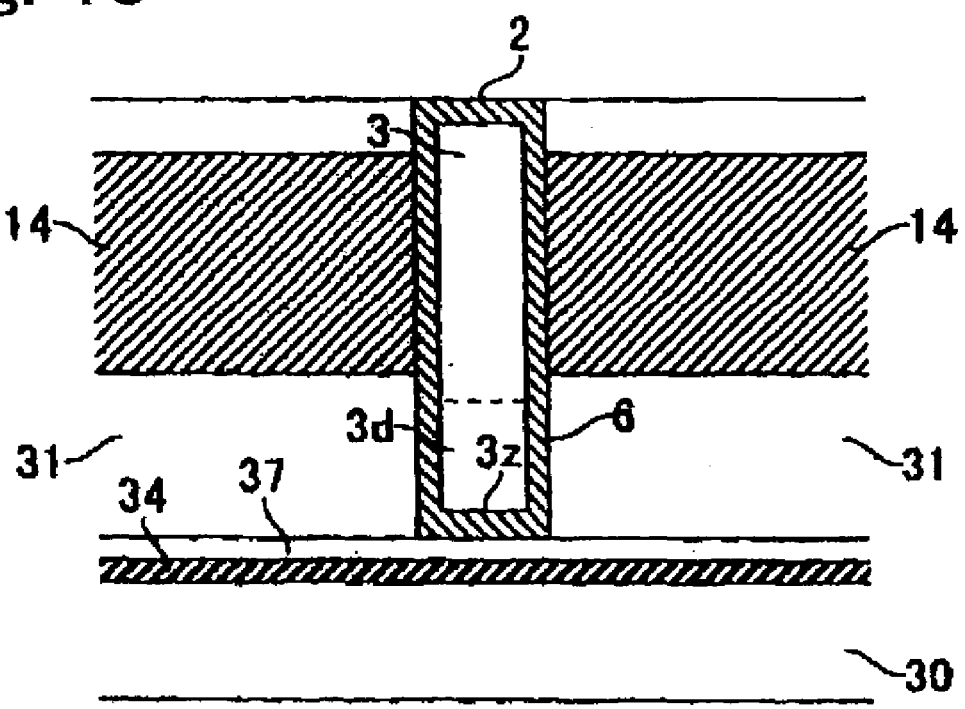
FIG. 18 is a side sectional view showing a structure of the periphery of the groove section in the optical switch 1b.

FIG. 18 is a sectional view of the optical switch 1*b*. The electrodes 34 are opposed to a lower surface 3*z* of the filter 3, which is put into the groove section 2, via the matching oil 6 and the insulating film 37. Since the operation of the optical switch 1*b* having such a structure is similar to that of the first embodiment, the explanation thereof is omitted.

<Fourth Embodiment>

Figure 19:
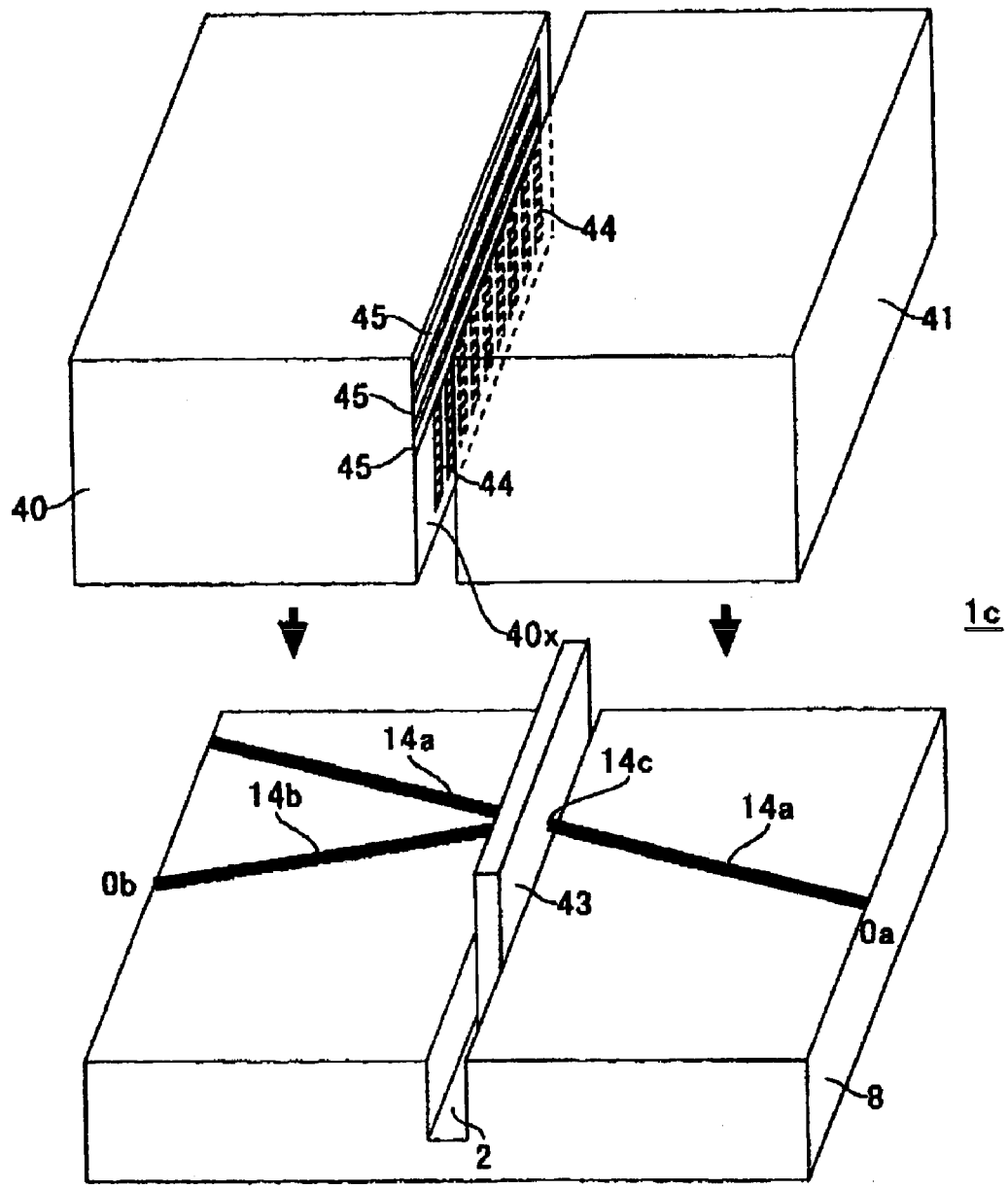
FIG. 19 is an exploded sectional view showing a structure of a periphery of a groove section in an optical switch 1c according to a fourth embodiment of the present invention.

FIG. 19 is an exploded perspective view showing an internal structure of an optical switch 1*c* according to a fourth embodiment of the present invention. Similarly to the second embodiment, in the optical switch 1c, a main body 8 is formed with two waveguides 14a and 14b, and a groove section 2 which crosses a crossed section 14c of the waveguides 14a and 14b. A filter 43 is put into the groove section 2 into which matching oil 6 has been sealed, and a portion provided with interference filters 3a through 3c are positioned in a vicinity of the crossed section 14c.

Differently from the filter 3 of the first through third embodiments, the filter 43 is constituted so as to protrude from the groove section 2 upward by 200 μm or more, and the protruded portion is a moving element section 43d. A plate section 40 with electrodes is provided on a surface of the portion of the main body 8 provided with the waveguides 14a and 14b. A side surface 40x of the plate section 40 with electrodes is provided with a plurality of electrodes 44 which function as stators for the moving element section 3d, and a three-phase wiring section 45 which applies a three-phase driving voltage to the plural electrodes 44. A plate section 41 is provided on a surface of the main body 8 provided only with the waveguide 14a. It is noted that the plural electrodes 44 are covered with an insulating film 47 as mentioned later but are not shown in FIG. 19 in order to simplify the explanation.

The insulating film 47 for covering the electrodes 44 and the three-phase wiring section 45 are provided on the side surface 40x of the plate section 40 with electrodes where the electrodes 44 and the three-phase wiring section 45 are provided. Moreover, the plate section 40 with electrodes is constituted by an insulating material. Similarly to the second embodiment, the electrodes 44 are made of metal films with thickness of 1000 Å and width of 5 μm, for example, and gaps between the electrodes are 5 μm.

Figure 20:
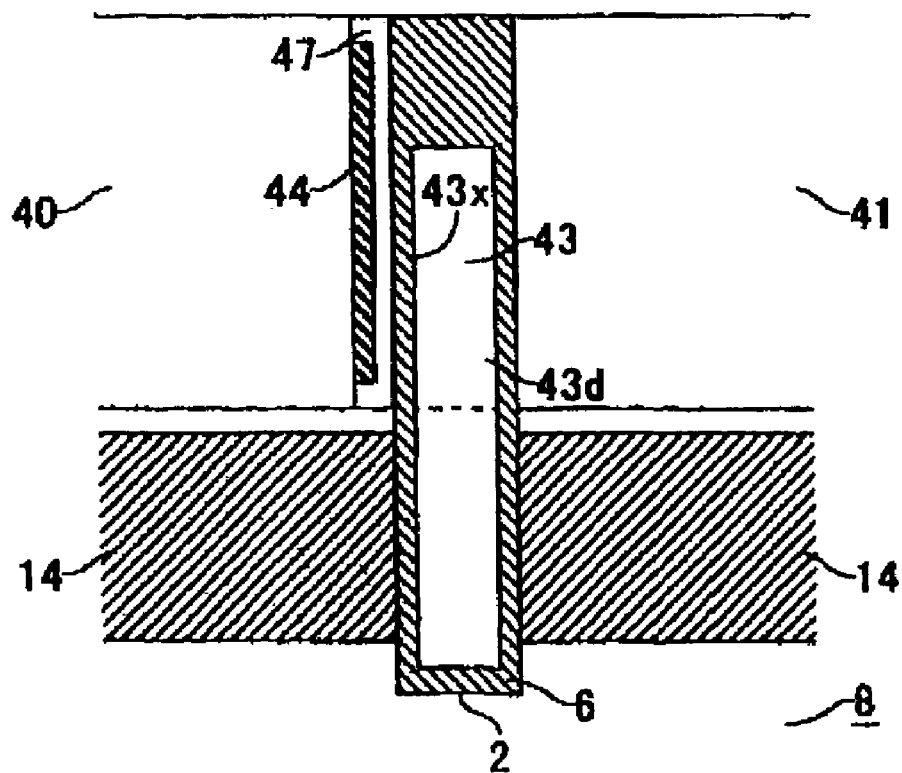
FIG. 20 is side sectional view showing a structure of the periphery of the groove section in the optical switch 1c.
Figure 21:
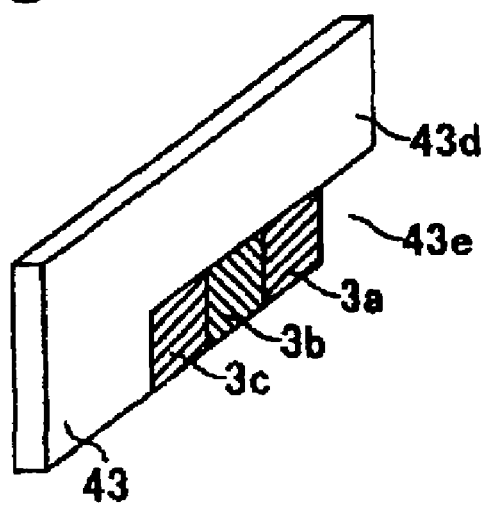
FIG. 21 is an outline perspective view showing a structure of a filter in the optical switch 1c.

FIG. 20 is a sectional view of the optical switch 1c. The electrodes 44 are opposed to the moving element section 43d on a side surface 43x of the filter 43 put into the groove section 2 via the matching oil 6 and the insulating film 47. As shown in FIG. 21, the filter 43 has interference filters 3a through 3c, which are provided so as to be opposed to a side surface of the groove section 2, and a notched section 43e for transmitting all incident lights.

Further, in the present embodiment, as shown in FIG. 21, the moving element section 43d is provided on the top portions of the notched section 43e and the interference filters 3a through 3c. Since the operation of the optical switch 1b having such a structure is similar to that of the first embodiment, the description thereof is omitted.

In the second through fourth embodiments, differently from the first embodiment, the electrodes 24 through 44 which function as stators are provided onto a layer different from the waveguides 14a and 14b. Therefore, the electrodes 24 through 44 in the optical switch in the second through fourth embodiments may be provided onto a position which is overlapped with the waveguides 14a and 14b or a position which is not overlapped with the waveguides 14a and 14b viewed from the upper surface of the optical switch.

In addition, in the first through fourth embodiments, another switching member, such as a micromirror instead of the filter, as well as the moving element section may be provided in the groove section so as to be opposed to the electrodes. As a result, the switch member provided so as to cross the waveguides is moved by the inductive charge type electrostatic system, so that an optical switch which does not require a movable plate and a heat radiating mechanism can be realized.

Further, in the first through fourth embodiments, instead of insulating matching oil to be sealed into the groove section, an insulating film may be provided onto the filter 3.

Figure 22:
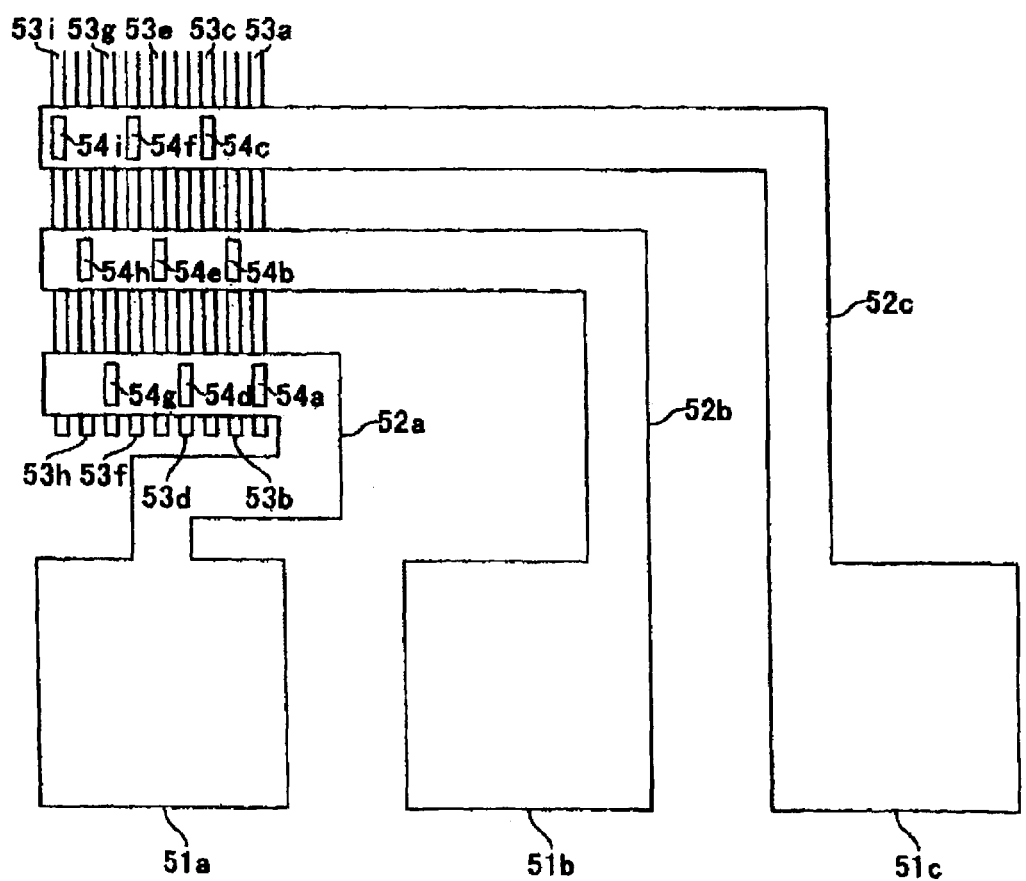
FIG. 22 is a diagram showing a relationship between stator and three-phase wiring section.
Figure 23:
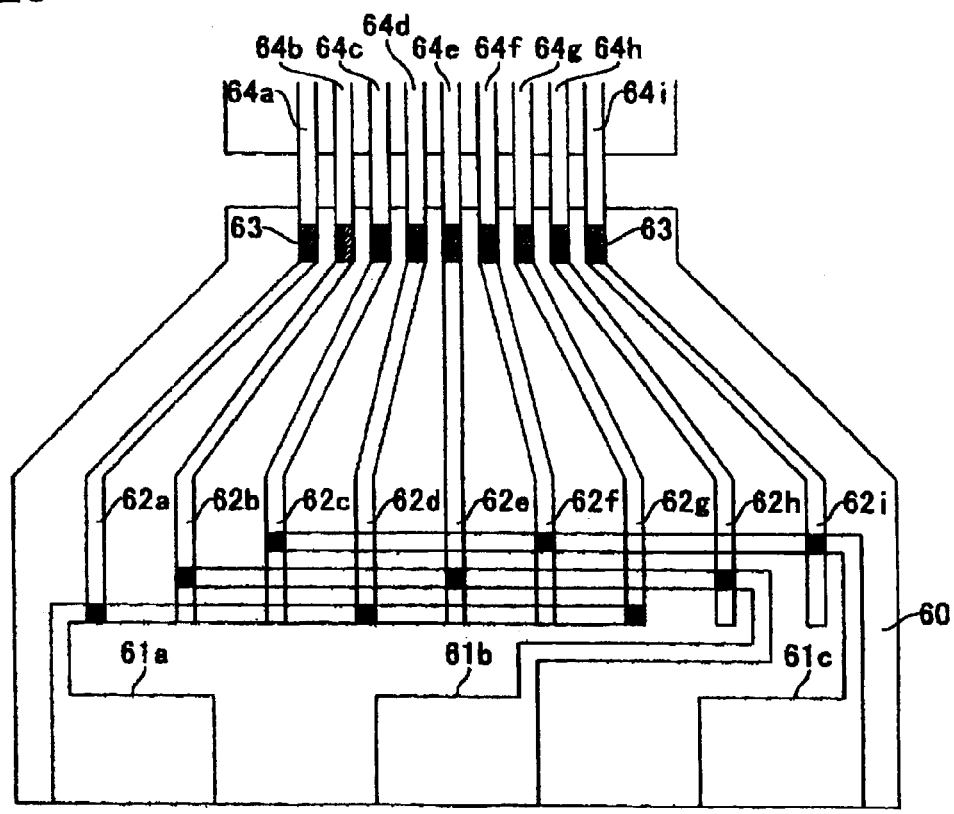
FIG. 23 is a diagram showing a relationship between stator and three-phase wiring section.

A relationship between the electrodes functioning as stators and the three-phase wiring section for applying a three-phase driving voltage to the electrodes may be as shown in FIG. 22 or 23, for example. Namely, as shown in FIG. 22, wirings 52a through 52c which are electrically connected with electrodes 51a through 51c may be provided, and electrodes 53a through 53i may be provided with contact holes 54a through 54i, respectively. A three-phase driving voltage is applied to the electrodes 51a through 51c. The electrodes 53a through 53i function as stators. The contact holes 54a through 54i electrically connect the electrodes 53a through 53i to the wirings 52a through 52c, respectively.

The electrodes 53a, 53d and 53g are connected with the wiring 52a, which is provided via the insulating film, through the contact holes 54a, 54d and 54g. The electrodes 53b, 53e and 53h are connected with the wiring 52b, which is provided via the insulating film, through the contact holes 54b, 54e and 54h. The electrodes 53c, 53f and 53i are connected with the wiring 52c, which is provided with the insulating film, through the contact holes 54c, 54f and 54i.

As shown in FIG. 23, a flexible substrate 60 having wirings 62a through 62i is provided so as to be electrically connected with electrodes 61a through 61c to which a three-phase driving voltage is applied. Electrodes 64a through 64i which function as stators are electrically connected with the wirings 62a through 62i of the flexible substrate 60 via ACF (anisotropy conductive film) 63. Therefore, the electrodes 64a, 64d and 64g are connected with the electrode 61a through the wirings 62a, 62d and 62g, the electrodes 64b, 64e and 64h are connected with the electrode 61b through the wirings 62b, 62e and 62h, and the electrodes 64c, 64f and 64i are connected with the electrode 61c through the wirings 62c, 62f and 62i.

With the above structure, the electrodes 64a through 64i having width of 5 μm provided with intervals of 5 μm can be electrically connected with the electrodes 61a through 61c having width of 100 μm provided on the flexible substrate 60 with intervals of 100 μm.

Figure 24:
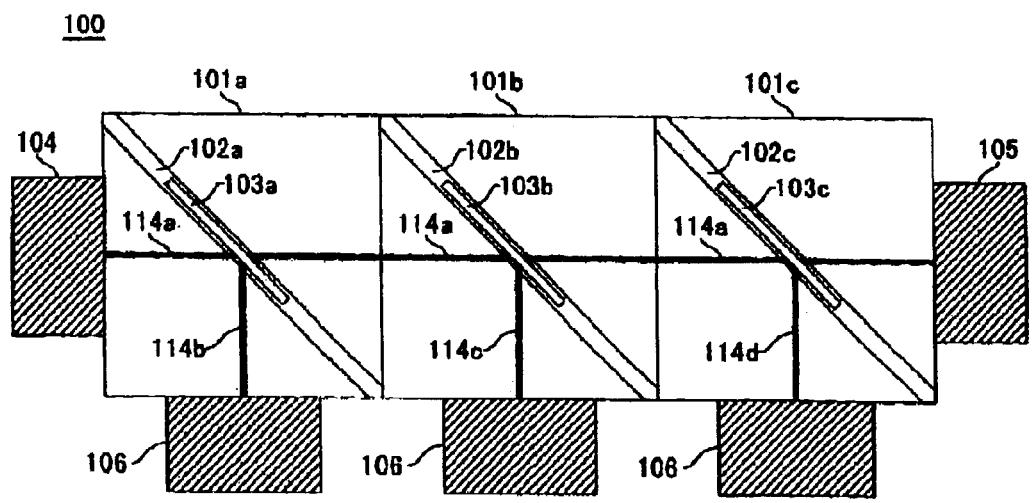
FIG. 24 is a plan view showing an optical switch line provided with a plurality of optical switches.

Next, there will be explained below an embodiment of an optical switch line provided with a plurality of optical switches. FIG. 24 is a plan view when a plurality of optical switches are provided. In the present embodiment, an optical switch line 100 is constituted so that the optical switches 101a through 101c having one of the structures in the first through fourth embodiments are arranged linearly. In the optical switch line 100, a waveguide 114a crosses waveguides 114b through 114d, and groove sections 102a through 102c are provided on the crossed sections, respectively, and filters 103a through 103c are put into the groove sections 102a through 102c, respectively.

An optical fiber 104 is connected with an input side (left in the drawing) of the waveguide 114a, and an optical fiber 105 is connected with an output side (right in the drawing) of the waveguide 114a. Optical fibers of an optical fiber array 106 are connected with output sides (downward in the drawing) of the waveguides 114b through 114d, respectively.

When a wavelength multiplexed light flux where lights with a plurality of wavelengths are superposed enters from the optical fiber 104, filters 103a through 103c provided in the groove sections 102a through 102c, respectively, are moved by using the inductive charge type electrostatic system, so that the light flux can be output from different optical fibers per wavelength.

Therefore, similarly to the above embodiment, when an optical switch line is composed of n-numbered optical switches, after a light where n-numbered wavelengths are multiplexed is divided into n-numbered optical fibers, they are directly input into 1×n-numbered optical switches without switching output, so that lights with arbitrary wavelengths can be output to the n-numbered optical fibers for output. Therefore, a conventional expensive branching filter or the like is not required, and a number of the optical switches can be reduced and loss of a light can be reduced.

As mentioned above, according to the present invention, after a driving voltage is applied to the stators and the moving element is electrostatically induced, the driving voltage is switched so that an electrostatic force acts upon the moving element and the stators. Since the electrostatic force is utilized so as to move the switching member, the stators can be located accurately per pitch. Moreover, since electrodes are arranged as stators so that a driving mechanism of the switching member can be structured, the driving mechanism can be miniaturized. Further, since the switching member which is provided on an optical path of an optical waveguide guides a light to different directions according to wavelengths, an incident light where wavelengths are multiplexed can be output separately by switching it per wavelength. Therefore, an additional branching filter or the like is not required, so that an optical communication system using an optical switch can be simplified.

In addition, since a plurality of electrodes to be stators are provided on different portion from optical waveguides, excessive loss of a waveguide light for propagating on an optical waveguide can be prevented. In addition, a plurality of electrodes are not constituted in a groove section but provided on a different layer, so that the stators to be electrostatic force generating section can be constituted simply.

Further, when a plurality of optical switches are provided on one optical path, a wavelength multiplexed light is not branched into a plurality of optical fibers but is directly input into optical switches arranged in series, so that lights with arbitrary wavelengths can be output to the respective optical fibers for output. Therefore, a conventional expensive branching filter or the like is not required, and a number of optical switches is reduced, thereby reducing a loss of a light.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical switch provided on an optical path of an optical waveguide and which switches an advancing direction of a light passed through the optical path, said optical switch comprising:
    a movable switching member including a moving element, said switching member switching the advancing direction of the light; and
    a driving member including a plurality of electrodes in proximity to, and separate from, said moving element, said moving element being opposed to said plurality of electrodes through an insulating layer, said moving element having a surface resistivity of $10^{10}$ $\Omega/\square$ to $10^{16}$ $\Omega/\square$, said moving element and said plurality of electrodes oriented such that said moving element is selectively moved so that the light passed through the optical path is guided to different directions in response to a switchable voltage applied selectively to said plurality of electrodes.

2. An optical switch as claimed in claim 1 wherein said switching member includes at least one interference filter which transmits light having a first predetermined wavelength and reflects light having a second predetermined wavelength.

3. An optical switch as claimed in claim 1 wherein said switching member includes a micromirror.

4. An optical switch which switches an advancing direction of a light passed through an optical path of an optical waveguide, said optical switch comprising:
    a main body;
    an optical waveguide provided on a surface of said main body;
    a groove section formed on a surface of the main body so as to cross the optical waveguide;
    a switching member put into said groove section and including a moving element and which switches the advancing direction of the light passed through the optical path; and
    a plurality of electrodes provided in proximity to, and separate from, said moving element of the switching member, said moving element being opposed to said plurality of electrodes through an insulating layer, said moving element having a surface resistivity of $10^{10}$ $\Omega/\square$ to $10^{16}$ $\Omega/\square$, said plurality of electrodes moving the moving element so that the light passed through the optical path is guided to different directions in response to a switchable voltage applied selectively to said plurality of electrodes.

5. An optical switch as claimed in claim 4 wherein said plurality of electrodes are provided on the surface of the main body.

6. An optical switch as claimed in claim 4, further comprising:
    an electrode layer opposed to the surface or a bottom of the main body through an insulating layer wherein said plurality of electrodes are provided on said electrode layer so as to be opposed to the moving element.

7. An optical switch as claimed in claim 4 wherein said switching member includes at least one interference filter which transmits light having a first predetermined wavelength and reflects light having a second predetermined wavelength.

8. An optical switch as claimed in claim 4 wherein said switching member includes a micromirror.

9. An optical switch as claimed in claim 4 wherein the optical switch is provided at plural portions along the optical path of the optical waveguide.

10. An optical switch which switches an advancing direction of a light passed through an optical path of an optical waveguide, said optical switch comprising:
    a main body;
    an optical waveguide provided on a surface of said main body;
    a groove section formed on a surface of the main body so as to cross the optical waveguide;
    a switching member put into said groove section and including a moving element and which switches the advancing direction of the light passed through the optical path;
    a plurality of electrodes provided in proximity to, and separate from, said moving element of the switching member, said plurality of electrodes moving the moving element so that the light passed through the optical path is guided to different directions in response to a switchable voltage applied selectively to said plurality of electrodes; and a plate section with electrodes provided on a surface of the main body wherein said moving element of the switching member protrudes from the groove section and said plurality of electrodes are provided so as to be opposed to the moving element.

11. An optical switch which switches an advancing direction of a light passed through an optical path of an optical waveguide, said optical switch comprising:

a main body;

an optical waveguide provided on a surface of said main body;

a groove section formed on a surface of the main body so as to cross the optical waveguide;

a switching member put into said groove section and including a moving element and which switches the advancing direction of the light passed through the optical path; and a plurality of electrodes provided in proximity to, and separate from, said moving element of the switching member, said plurality of electrodes moving the moving element so that the light passed through the optical path is guided to different directions in response to a switchable voltage applied selectively to said plurality of electrodes, wherein the electrodes are made of metal films with a thickness of 1000 Å and a width of 5 $\mu$m, and gaps between the electrodes are 5 $\mu$m.

12. An optical switch which switches an advancing direction of a light passed through an optical path of an optical waveguide, said optical switch comprising:

a main body;

an optical waveguide provided on a surface of said main body;

a groove section formed on a surface of the main body so as to cross the optical waveguide;

a switching member put into said groove section and including a moving element and which switches the advancing direction of the light passed through the optical path; and a plurality of electrodes provided in proximity to, and separate from, said moving element of the switching member, said plurality of electrodes moving the moving element so that the light gassed through the optical path is guided to different directions in response to a switchable voltage applied selectively to said plurality of electrodes, wherein a different voltage is applied to at least one electrode in the plurality of the electrodes.

13. An optical switch, said optical switch comprising:

a moving element for changing a direction of a guided light beam;

a driving member including a plurality of electrodes in proximity to, and separate from, said moving element, said plurality of electrodes moving said moving element in response to time-phased driving voltages applied to said plurality of electrodes to one of a plurality of positions such that the guided light beam is guided in at least one of a plurality of different directions; and an insulating film covering at least one of said plurality of electrodes.

14. An optical switch as claimed in claim 13, wherein said guided light beam includes light having a first wavelength and light having a second wavelength, said first wavelength being different than said second wavelength, and wherein the moving element is adapted to guide the light having the first wavelength in a first direction of the plurality of different directions and said light having a second wavelength in a second direction of the plurality of directions, said first direction being different than said second direction.

15. An optical switch as claimed in claim 14, wherein said moving element includes:

at least one interference filter for transmitting or reflecting light having said first wavelength; and at least one interference filter for transmitting or reflecting light having said second wavelength.

16. An optical switch as claimed in claim 13 wherein said plurality of positions includes at least three positions.

17. An optical switch comprising:

a moving element for changing a direction of a guided light beam; and a driving member including a plurality of electrodes in proximity to, and separate from, said moving element, said plurality of electrodes moving said moving element in response to time-phased driving voltages applied to said plurality of electrodes to one of a plurality of positions such that the guided light beam is guided in at least one of a plurality of different directions, wherein each of the plurality of electrodes has a width of 5 $\mu$m and wherein a spacing between adjacent ones of said plurality of electrodes is 5 $\mu$m.

* * * * *